United States Patent [19]

Turnbull

[11] 4,074,339
[45] Feb. 14, 1978

[54] METHOD AND APPARATUS FOR MEASURING THE SPEED OF A ROTATING SHAFT

[75] Inventor: Fred G. Turnbull, Scotia, N.Y.

[73] Assignee: General Electric Company, Schenectady, N.Y.

[21] Appl. No.: 730,144

[22] Filed: Oct. 6, 1976

[51] Int. Cl.² .............................................. H02P 9/00
[52] U.S. Cl. ..................................... 361/239; 324/165
[58] Field of Search .................. 361/236, 239, 240; 324/163, 165, 166, 167; 340/192, 195, 196, 198; 321/62, 63, 64, 68; 322/29, 31

[56] References Cited

U.S. PATENT DOCUMENTS

| | | | |
|---|---|---|---|
| 3,445,697 | 5/1969 | Costa | 310/68 |
| 3,710,186 | 1/1973 | Sharp | 361/239 X |
| 3,858,109 | 12/1974 | Liden | 324/163 X |

FOREIGN PATENT DOCUMENTS

| | | | |
|---|---|---|---|
| 2,450,017 | 5/1976 | Germany | 322/29 |
| 986,100 | 3/1965 | United Kingdom | 324/167 |

*Primary Examiner*—Harry E. Moose, Jr.
*Attorney, Agent, or Firm*—Donald R. Campbell; Joseph T. Cohen; Jerome C. Squillaro

[57] ABSTRACT

A pair of polyphase electrical machines with interconnected rotor windings are mechanically coupled together and driven by a rotating shaft. One stator winding is excited by a fixed carrier frequency, and the output frequency at the other stator winding is proportional to shaft speed. The output signal frequency is not zero at zero shaft speed and is unique for both directions of shaft speed. Brushes, slip rings, and electrical connections to the rotating shaft are not required.

10 Claims, 3 Drawing Figures

METHOD AND APPARATUS FOR MEASURING THE SPEED OF A ROTATING SHAFT

BACKGROUND OF THE INVENTION

This invention relates to measurement of the speed of a rotating shaft, and more particularly to a method and apparatus for developing an electrical signal whose frequency is indicative of the shaft speed for either direction of rotation and is not zero at zero shaft speed.

The output signals from conventional dc and ac tachometers approach zero level and zero frequency when the rotating shaft speed approaches zero. With the shaft turning very slowly, the output dc level of a dc tachometer is very low and noise and drift can produce significant changes in output signal that are not directly related to shaft speed. In the case of an ac tachometer, the output frequency and output voltage magnitude approach zero resulting in loss of signal and a long time constant associated with the low-frequency output. The output frequency is also the same for both directions of rotation. Of course, there are various other techniques for providing an electrical signal proportional to shaft speed. For applications such as the sensing of rotor speed in an adjustable speed ac or dc motor reversing drive system, an improved technique for accurate speed measurement especially at and near zero speed is needed.

SUMMARY OF THE INVENTION

The system for determining the speed of a rotating shaft as herein described develops an electrical signal whose frequency is indicative of the shaft speed and direction of rotation and is not zero at zero shaft speed. The preferred embodiment uses a pair of polyphase electrical machines with separate rotors and stators, the rotors being mechanically coupled together for rotation with the rotating shaft whose speed is to be measured. The polyphase rotor windings of the two machines are connected together in parallel relationship with the phase sequence of one rotor winding reversed as compared to the other rotor winding. A fixed carrier frequency voltage produced by a voltage source is applied to one of the polyphase stator windings to thereby induce into the associated rotor winding a polyphase voltage having a second frequency representative of shaft speed. Upon phase reversal by the rotor winding of the second machine, there is induced into the associated stator winding a polyphase voltage having a third frequency which is also representative of shaft speed. Output means is provided to derive from the voltage induced into the stator winding of the second machine an output signal with a frequency indicative of shaft speed. For two electrical machines with the same number of poles, the output signal frequency at zero shaft speed equals the carrier frequency (for instance, 400 Hz) and has unique values for both directions of rotation. The output signal can be supplied in digital form or in analog form.

Alternatively the pairs of polyphase rotor and stator windings when properly arranged can be on the rotor and stator structure of a single machine. In either case, the system does not require brushes, slip rings, or electrical connections to the rotating shaft. A method of deriving an electrical signal indicative of the speed of a rotating shaft and its direction of rotation is in accordance with the foregoing.

DESCRIPTION OF THE PREFERRED EMBODIMENT

Figure 1:
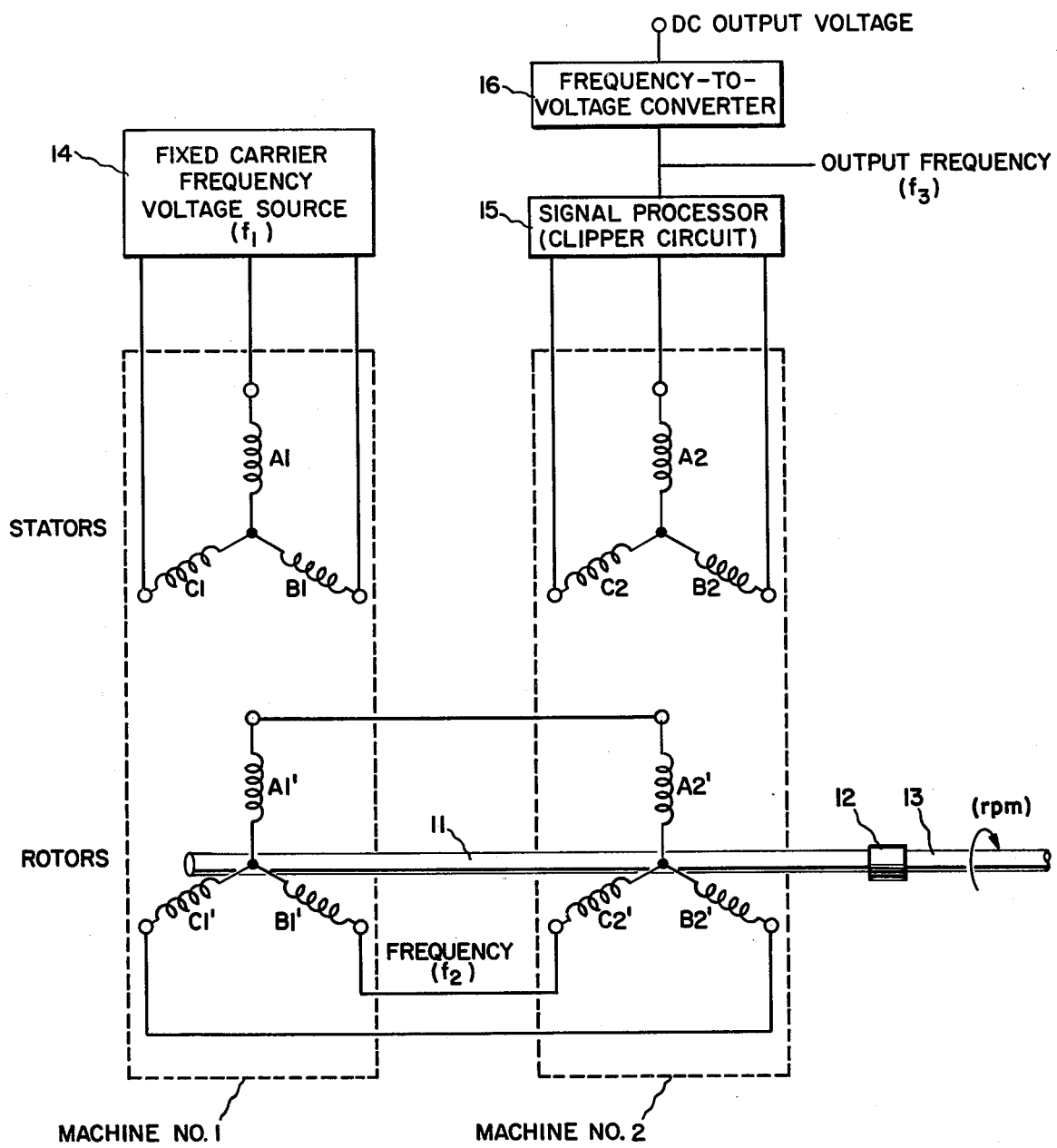
FIG. 1 is a schematic diagram partially in block diagram form of a system with two mechanically coupled polyphase electrical machines for indicating the speed and direction of rotation of a rotating shaft.

The apparatus in FIG. 1 uses a pair of polyphase electrical machines with separate rotors that are electrically interconnected and mechanically coupled to one another and attached to the shaft whose speed is to be measured. A fixed carrier frequency is applied to the stator winding of one machine, and the electrical output signal with frequency proportional to shaft speed is obtained at the stator winding of the second machine. The output signal frequency is linearly related to shaft speed, is not zero at zero shaft speed, and has different values for clockwise and counterclockwise rotation.

Both electrical machines, identified as machine No. 1 and machine No. 2 in FIG. 1, are provided with polyphase stator and rotor windings. The two machines are assumed to have the same number of electrical poles, although this is not a requirement, and can be described as having a wound-rotor type of construction. The machines are shown with three-phase stator and rotor windings, but two- or four-phase windings can also be utilized. The two electrical machines can have separate rotor shafts that are mechanically coupled together or, as is illustrated, have a common rotor shaft 11 which is coupled by means of a conventional coupling member 12 for rotation with a rotating shaft 13 whose speed is being measured. Rotating shaft 13, by way of illustration, is the shaft of a variable speed reversing motor, although the apparatus and the speed and direction of rotation indicating technique has general application. The polyphase rotor winding of machine No. 1 is electrically connected in parallel circuit relationship with the polyphase rotor winding of machine No. 2, with the phase sequence of one rotor winding reversed as compared with the phase sequence of the other rotor winding.

A fixed carrier frequency polyphase voltage is generated by a voltage source 14 and applied to the polyphase stator windings A1, B1, and C1 of the first machine. The carrier frequency $f_1$ is typically 400 Hz, and can be generated with high stability by using a crystal or other fixed frequency oscillator and suitable count-down circuit to the carrier frequency level. As more broadly defined, the carrier frequency source may be three-phase 60 Hz voltage taken directly from the line, but a higher carrier frequency is desirable to improve the sensitivity of speed measurement with reduced electromagnetic interference from other 60 Hz equipment.

Due to the rotation of shaft 11, a polyphase voltage having a second frequency $f_2$ is induced into the polyphase rotor windings A1', B1', and C1' of the first machine. Where the carrier frequency $f_1$ is applied to the stator, the frequency induced into the rotor winding is given by the equation $$f_2 = f_1 + (P/120)(RPM),\qquad(1)$$

where P is the number of poles on the stator and rotor of machine No. 1, and RPM is the shaft speed. This second frequency $f_2$ is seen to be proportional to shaft speed, that is, $$f_2 = \text{constant 1} + \text{constant 2 (RPM)}.\qquad(2)$$

However, this frequency is located on the rotor and is unavailable unless brought out to the stationary output electronics via slip rings. In order to eliminate slip rings, the second machine is provided. In this case, the rotor phase connections of rotor windings A2', B2', and C2' on machine No. 2 are reversed in order to develop a speed proportional signal on the stator of the second machine. Thus, in the second machine a polyphase voltage is induced into the associated stator windings A2, B2, and C2 having a third frequency $f_3$ also proportional to the speed of the rotating shaft. In particular, the frequency induced into the stator winding of the second machine is equal to $$f_3 = f_1 + 2(P/120)(RPM).\qquad(3)$$

Figure 2:
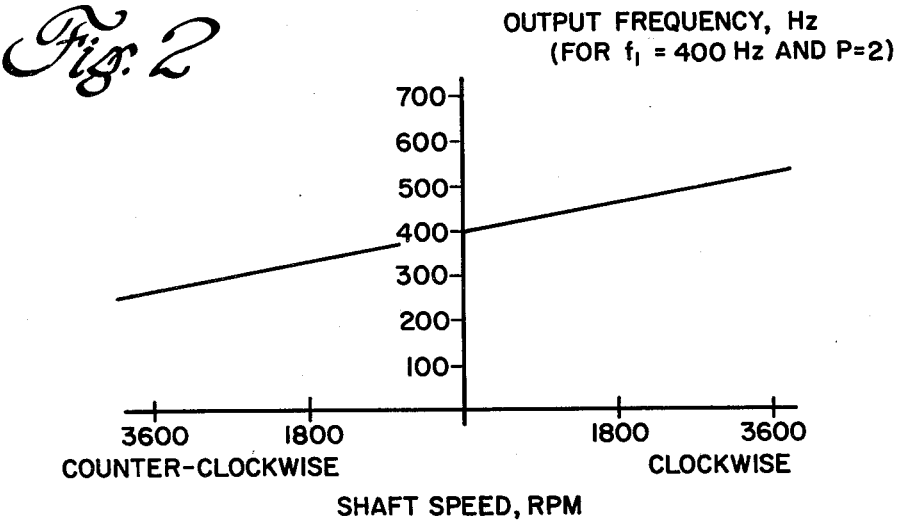
FIG. 2 is a plot of output signal frequency versus shaft speed for both directions of rotation.

FIG. 2 shows that the output signal frequency varies linearly with shaft speed over the complete range of clockwise and counter-clockwise speeds and has a finite value, i.e., is not zero, at zero shaft speed. For two electrical machines having the same number of poles, the frequency of the output signal is equal to the carrier frequency at zero shaft speed. The data given in FIG. 2 assumes a maximum speed of 3600 RPM in both the forward and reverse directions, two-pole machines, and a 400 Hz carrier frequency. For rotation in the clockwise direction, the output signal frequency increases linearly above 400 Hz to a maximum of 520 Hz, and for rotation in the counter-clockwise direction the output signal frequency decreases linearly to a minimum of 280 Hz. It is seen that the frequency of the output signal is unique and has a different frequency value for each direction of rotation.

The polyphase voltage with a frequency $f_3$ which is induced into the stator winding of the second machine is processed to derive an output signal indicative of the shaft speed and direction of rotation. The output signal can be generated in either digital or analog form. In general, the output signal is processed to sense the zero crossings, which are proportional to frequency, and ignore the output signal magnitude which will not approach zero voltage if the carrier frequency is higher than the synchronous frequency of the two machines. The voltage induced into the stator winding of machine No. 2 is fed to a signal processor 15 in the form of a clipper circuit for limiting the magnitude of one polarity of the voltage and producing a digital type output signal comprising a series of square pulses with a count corresponding to the output frequency. This output signal of fixed magnitude with the frequency $f_3$ can be directly utilized in digital control systems. For use in adjustable speed ac motor drive systems as presently known, various digital frequency adders or subtractors can be provided to eliminate the carrier frequency component ($f_1$) or to add or subtract a digital slip frequency signal component. To further explain the latter, these motor control systems commonly include a summing circuit for adding the actual motor speed to a slip frequency signal to obtain an inverter operating frequency signal which corresponds to the induction motor excitation frequency. Additionally, the output means can include a frequency-to-voltage converter 16 for converting the digital output signal to a variable dc voltage. This analog signal also can be an input to various motor control systems.

Figure 3:
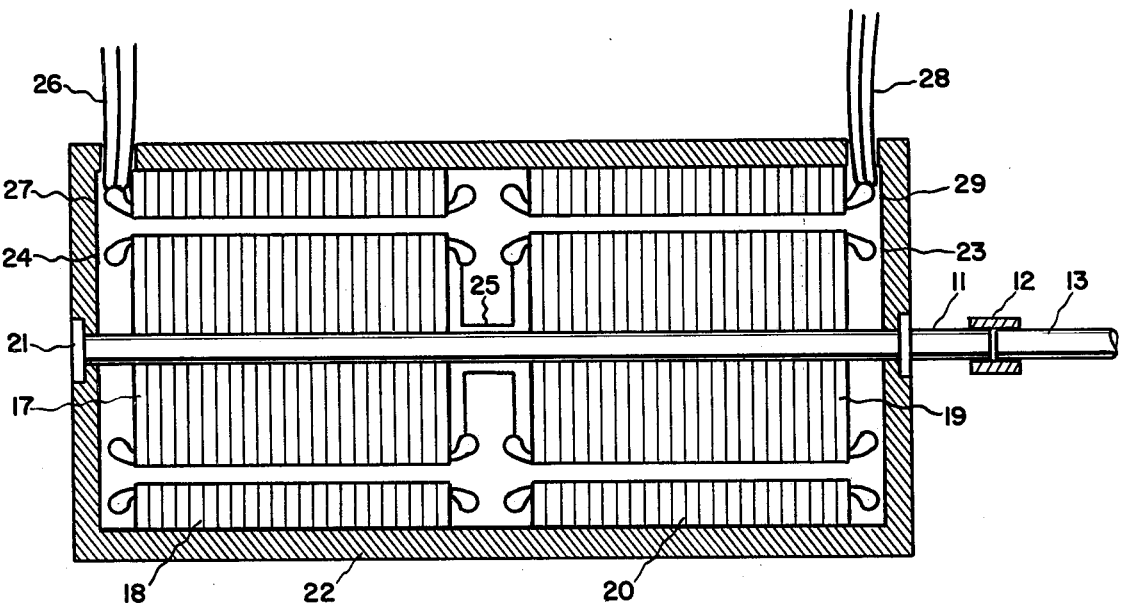
FIG. 3 is a diagrammatic cross sectional view of the mechanical features of a speed sensing apparatus with separate electrical machines and a common rotor shaft and shell.

FIG. 3 illustrates diagrammatically the mechanical features of a speed sensing apparatus with two separate electrical machines sharing a common rotor shaft and shell. In the drawing, the rotor and stator of the first electrical machine are indicated at 17 and 18, the rotor and stator of the second electrical machine are indicated at 19 and 20, the bearings are indicated at 21, and the common shell or housing is indicated at 22. The polyphase rotor windings 23 and 24 of the two machines are electrically interconnected by wires 25 which can be affixed to the exterior of shaft 11. Wires 26 serve to connect the input electronics or voltage source to the polyphase stator winding 27 of one machine, and wires 28 connect the output electronics to the polyphase stator winding 29 of the other machine.

Alternatively, the two machines sketched schematically in FIG. 1 can be combined into a single structure having only one rotor and one stator. There are certain pole configurations and winding configurations that can be used, as will be apparent to those skilled in the art, and the stator windings are physically arranged in non-inductive relationship. The combined structure, of course, has a pair of polyphase stator windings and also a pair of electrically connected polyphase rotor windings, the operation of the system being identical.

In summary, the broadly defined method of sensing speed and direction of rotation comprises the steps of coupling a pair of polyphase rotor windings on one electrical machine or two separate machines for rotation with the rotating shaft whose speed is to be measured; supplying a fixed carrier frequency polyphase voltage to a first stator winding and inducing into associated rotor winding a polyphase voltage having a frequency proportional to or representative of shaft speed; applying the induced polyphase voltage in parallel circuit relationship to the other rotor winding which has a reversed phase sequence; inducing into the second stator winding a polyphase voltage also having a frequency proportional to or representative of shaft speed; and processing the last-mentioned induced voltage to generate an electrical output signal with a frequency indicative of the speed and direction of rotation of the rotating shaft.

While the invention has been particularly shown and described with reference to a preferred embodiment thereof, it will be understood by those skilled in the art that the foregoing and other changes in form and details may be made therein without departing from the spirit and scope of the invention.

The invention claimed is:

1. A system for generating an electrical signal indicative of the speed of a rotating shaft comprising
    at least one electrical machine including at least one rotor having a pair of polyphase rotor windings coupled for rotation with the rotating shaft whose speed is to be measured, said polyphase rotor windings being connected together in parallel circuit relationship with the phase sequence of one rotor winding reversed as compared to the other rotor winding, said electrical machine further including at least one stator having a pair of polyphase stator windings, source means for applying to one stator winding a fixed carrier frequency polyphase voltage to thereby induce into one rotor winding a second polyphase voltage having a second frequency representative of shaft speed and consequently induce into the other stator winding a third polyphase voltage having a third frequency also representative of shaft speed, and output means for deriving from the third induced polyphase voltage an output signal with a frequency indicative of the speed of the rotating shaft and direction of rotation.

2. The apparatus defined in claim 1 wherein said output means includes a clipper circuit for generating said output signal in digital form.

3. The apparatus defined in claim 2 wherein said output means further includes a frequency-to-voltage converter for generating an analog output signal.

4. A system for generating an electrical signal indicative of the speed of a rotating shaft comprising a pair of electrical machines each having a rotor with a polyphase rotor winding and a stator with a polyphase stator winding, said polyphase rotor windings being connected together in parallel circuit relationship with the phase sequence of one rotor winding reversed as compared to the other rotor winding, said rotors further being coupled together for rotation with a rotating shaft whose speed is to be measured, source means for applying to one stator winding a fixed carrier frequency polyphase voltage to thereby induce into the respective rotor winding a second polyphase voltage having a second frequency proportional to shaft speed and consequently induce into the other stator winding a third polyphase voltage having a third frequency also proportional to shaft speed, and output means for deriving from the third induced polyphase voltage an output signal with a frequency indicative of the speed of the rotating shaft and direction of rotation.

5. The apparatus defined in claim 4 wherein said electrical machines have a common housing and said rotors have a common rotor shaft adapted to be coupled to the rotating shaft whose speed is to be measured.

6. The apparatus defined in claim 4 wherein said output means includes a clipper circuit for generating said output signal in digital form.

7. The apparatus defined in claim 5 wherein said output means further includes a frequency-to-voltage converter for converting the digital output signal to a variable unidirectional voltage output signal.

8. The method of deriving an electrical signal indicative of the speed of a rotating shaft comprising the steps of coupling a pair of polyphase rotor windings on at least one electrical machine for rotation with a rotating shaft whose speed is to be measured, supplying a fixed carrier frequency polyphase voltage to a first polyphase stator winding and inducing into one rotor winding a second polyphase voltage having a second frequency proportional to the shaft speed, applying the second polyphase voltage in parallel circuit relationship to the other rotor winding which has a reversed phase sequence as compared to the one rotor winding, inducing into a second polyphase stator winding a third polyphase voltage having a third frequency also proportional to the shaft speed, and processing said third polyphase voltage to generate an output signal with a frequency indicative of the speed of the rotating shaft and direction of rotation.

9. The method defined in claim 8 wherein the last-mentioned step comprises clipping the magnitude of the third voltage to produce said output signal in digital form.

10. The method defined in claim 9 further including the step of converting said digital output signal to a variable unidirectional voltage output signal.

* * * * *